United States Patent [19]

Yasunaga et al.

[11] Patent Number: 4,801,500

[45] Date of Patent: Jan. 31, 1989

[54] MAGNETIC RECORDING MEDIUM

[75] Inventors: Tadashi Yasunaga; Akio Yanai, both of Kanagawa, Japan

[73] Assignee: Fuji Photo Film Co., Ltd., Kanagawa, Japan

[21] Appl. No.: 133,829

[22] Filed: Dec. 16, 1987

[30] Foreign Application Priority Data

Dec. 16, 1986 [JP] Japan ................................ 61-297675

[51] Int. Cl.$^4$ ................................................ G11B 5/64
[52] U.S. Cl. .................................... 428/336; 427/128; 427/132; 428/694; 428/900
[58] Field of Search .................... 428/694, 900, 336; 427/128, 132

[56] References Cited

U.S. PATENT DOCUMENTS

| 4,452,857 | 6/1984 | Yamazaki | 428/900 |
| 4,557,944 | 12/1985 | Arai et al. | 427/132 |
| 4,661,418 | 4/1987 | Yanai et al. | 428/900 |
| 4,663,193 | 5/1987 | Endo et al. | 428/694 |

FOREIGN PATENT DOCUMENTS 59-207426 11/1984 Japan .
60-59537 4/1985 Japan .

OTHER PUBLICATIONS

Japanese Patent Application (OPI) No. 54,023/86 (p. 124, line 10 to p. 125, left col., line 7).

*Primary Examiner*—Paul J. Thibodeau
*Attorney, Agent, or Firm*—Sughrue, Mion, Zinn, Macpeak & Seas

[57] ABSTRACT

A magnetic recording medium is described, comprising a non-magnetic support having provided thereon a thin ferromagnetic metal film, wherein the thin ferromagnetic metal film contains an iron atom, a nitrogen atom and an oxygen atom within the following atomic percent ranges:

$$57 \leq a \leq 90$$

$$2 \leq b \leq 20$$

$$5 \leq c \leq 23$$

$$b + c < 25$$

in which a, b and c represent the percentage of iron atom, nitrogen atom and oxygen atom, respectively, based on the total of these atoms in the thin ferromagnetic metal film.

7 Claims, 1 Drawing Sheet

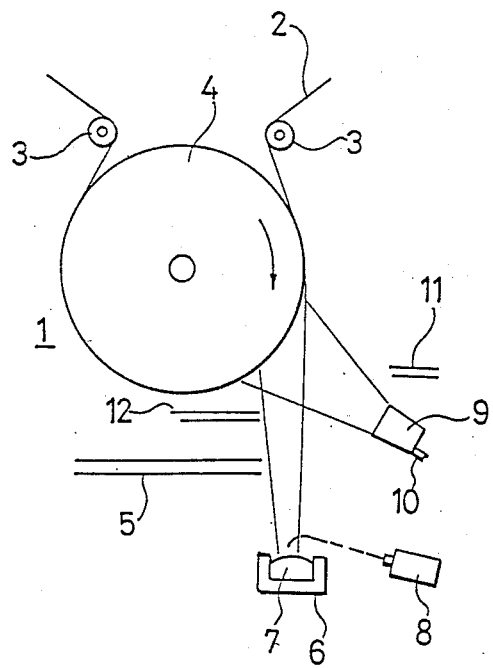

MAGNETIC RECORDING MEDIUM

FIELD OF THE INVENTION

The present invention relates to a magnetic recording medium and more particularly it relates to a magnetic recording medium of a thin metal film type which does not generate rust.

BACKGROUND OF THE INVENTION

In the past, a coating type of magnetic recording media has been widely employed. This type of media is generally obtained by coating on a non-magnetic support a magnetic coating composition prepared by dispersing a powdery magnetic material into an organic binder and drying it.

However, a coating type of a magnetic recording media has the disadvantages that saturation magnetization is low due to ferromagnetic particles being mainly used as the metal oxide particles and the density of ferromagnetic particles in the magnetic layer cannot be increased due to organic binders being included in the magnetic layer. Therefore, this type of media is not suitable for high density recording and the manufacturing steps are complicated.

In recent years, there has been a demand for high density recording and a magnetic recording medium comprising a non-magnetic support having provided thereon a thin metal film has been developed to respond to the above demand. Such a recording medium is prepared by forming on a mon-magnetic support a thin metal film by a vapor deposition method such as vacuum evaporation, sputtering or ion-plating or a metal plating method such as electroplating or non-electrolysis plating. The magnetic composition is not limited to metals, but metal is the typical magnetic component.

The above described medium is hereunder referred to as a thin metal film type magnetic recording medium. As the above described medium does not use organic binders, it is also referred to as a non-binder type magnetic recording medium.

In a thin metal film type magnetic recording medium, the thin film is composed of ferromagnetic metal having high saturation magnetization without containing binders. Therefore, such a medium can have higher coercive force and a thinner film than a coating type medium, is scarcely affected by demagnetization in a short wavelength region, can attain high density recording and can be prepared by a simple manufacturing process. Therefore, this type of media has recently drawn much attention.

However, even though the thin metal film of the thin metal film type magnetic recording medium appears to have a uniform and smooth metal surface, microscopically it has a structure composed of coarse metal particles and readily corrodes.

For the above reason, the thin metal film type magnetic recording medium has poorer weather resistance and corrosion resistance than the coating type magnetic recording medium. Particularly, with regard to a magnetic recording medium such as a cassette tape or a video tape, the surface thereof is rubbed by a magnetic head during the recording and reproducing operation. If even a slight amount of corrosion is present on a thin metal film surface, it is removed by the rubbing action, thereby causing head clogging and scratching of the magnetic head and the magnetic recording medium.

Further, the thin metal film type magnetic recording medium has poor durability. As the thin metal film is smooth, friction is great and stick-slip takes place. Still durability (durability at still mode) on a VTR is poorer than that of the coating type magnetic recording medium.

Many attempts have been made to improve weather resistance and durability, such as the method of providing a surface nitrated treatment by ion plating (Japanese Patent Application (OPI) No. 33806,75), the method of providing a silicon nitride film by sputtering (Japanese Patent Application (OPI) No. 30304/78), the method of forming a non-magnetic surface layer by exposing a magnetic layer to discharge in a nitrogen gas atmosphere (Japanese Patent Application (OPI) No. 85403/78) and the method of providing a nitrated metal thin film on a thin magnetic metal film (Japanese Patent Application (OPI) No. 143111/79). (The term "OPI" used herein means an unexamined published application.)

Providing a magnetic thin film composed of iron nitride or of iron and iron nitride is suggested for the non-binder type magnetic recording medium as disclosed in European Pat. No. 8328 and in Japanese Patent Application (OPI) No. 87809/84.

One of the inventors of the present invention previously suggested in Japanese Patent Application (OPI) No. 54023/86, of which he is one of the co-inventors, a magnetic recording medium comprising a non-magnetic support having provided thereon a thin magnetic film mainly composed of iron nitride oxide having the following formula.

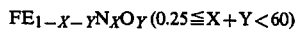

$$FE_{1-X-Y}N_XO_Y \ (0.25 \leq X+Y < 60)$$

However, the above earlier invention has the disadvantage that the film thickness must be increased to effectively improve weather resistance and durability and the drawback that even though the magnetic recording medium mainly containing iron nitride or iron nitride oxide can improve weather resistance, magnetic characteristics are decreased.

SUMMARY OF THE INVENTION

An object of the present invention is to provide a practical magnetic recording medium having excellent corrosion resistance and excellent magnetic characteristics, removing the above described defects.

In the present invention, a magnetic layer is mainly composed of iron and further contains nitrogen and oxygen. Therefore, it can be said that the magnetic layer of the present invention is composed of iron nitride oxide. A magnetic recording medium having excellent corrosion resistance and magnetic characteristics can be obtained by requiring the nitrogen and oxygen contents to be within specified ranges.

That is, the present invention relates to a magnetic recording medium comprising a non-magnetic support having provided thereon a thin ferromagnetic metal film, wherein the thin ferromagnetic metal film contains an iron atom, a nitrogen atom and an oxygen atom within the following atomic percent ranges:

$57 \leq a \leq 90$ $2 \leq b \leq 20$ $5 \leq c \leq 23$ $$b+c<25$$

in which a, b and c represent the percentage of iron atom, nitrogen atom and oxygen atom, respectively, based on the total of these atoms in the thin ferromagnetic metal film.

BRIEF EXPLANATION OF THE DRAWING

FIGURE shows an exemplary apparatus for manufacturing a magnetic recording medium of the present invention by vapor deposition.

1: Vapor deposition apparatus
2: Non-magnetic support
3: Guiding roll
4: Cooling can
5: Mask
6: Crucible
7: Iron (materials to be deposited)
8: Electron beam gun
9: Ion gun
10: Nitrogen
11 and 12: Oxygen introducing pipe

DETAILED DESCRIPTION OF THE INVENTION

It is preferred that the iron atom, nitrogen atom and oxygen atom content fall within the following atomic percent ranges $$65 \leq a \leq 85$$

$$3 \leq b \leq 15$$

$$10 \leq c \leq 22$$

$$b+c<25,$$

and b of from 8 to 12 and c of from 10 to 12 are particularly preferred.

The composition of the thin metal film containing iron, nitrogen and oxygen is not completely understood by applicants, because it is too complicated, but appears to be pure iron and a mixture of iron nitride and iron oxide or a composite thereof. As iron nitride, $\epsilon$-$FE_{2-3}N$ is not preferred because it is non-magnetic, $\gamma$-$FE_4N$ is magnetic and $FE_8N$ (also known as $FE_{16}N_2$) is the most magnetic. Iron appears to have a form of $\alpha$-Fe.

The vapor deposited magnetic film is prepared on a non-magnetic support by an inclined vapor deposition method for forming a magnetic layer of a thin metal film. The vapor deposition is conducted by heating iron contained in a crucible with electron beams to vaporize iron and to deposit the iron atoms on the non-magnetic support present at an inclined angle. In this case, an ion gun is installed in a vacuum bath and nitrogen ion is supplied therefrom, and oxygen may be supplied together with nitrogen or may be supplied as atmospheric gas into the vapor deposition area.

The iron, nitrogen and oxygen content contained in the magnetic layer can be adjusted to a predetermined range by adjusting the degree of strength of the electron beam and by adjusting the amounts of nitrogen ion and oxygen gas supplied.

FIGURE is an apparatus 1 for forming a thin metal film. A non-magnetic support 2 travels toward a cooling can 4 through a guiding roll 3 and, while it is travelling, a thin metal film is vapor-deposited on the non-magnetic support. Iron 7, the material to be vapor-deposited, is put in a crucible 6 and electron beams are jetted from an electron gun 8 and are irradiated onto the iron 7 to vaporize the iron atoms and to direct them to the non-magnetic support. A mask 5 is installed so that the vaporized iron atoms are deposited with an inclined angle on the non-magnetic support, preferably with the incidence angle $\theta$ of the vaporized iron atom being continuously decreased from $\theta$max to $\theta$min. Nitrogen 10 is provided with an ion gun 9 and, while ionized nitrogen is supplied to the vapor deposition area, oxygen is also supplied through an introducing pipe 11 or 12. The degree of vacuum during vapor-deposition is about $10^{-4}$ to $10^{-6}$ Torr.

The thickness of the magnetic layer of the magnetic recording medium of the present invention is generally from 0.02 to 5.0 $\mu$m and is preferably from 0.05 to 2.0 $\mu$m.

Suitable non-magnetic supports for use in the present invention include a plastic support such as polyethylene terephthalate, polyimide, polyamide, polyvinyl chloride, cellulose triacetate or polycarbonate.

A lubricating layer may be formed on the magnetic layer of the magnetic recording medium of the present invention. The lubricating agents include fatty acids having from 12 to 18 carbon atoms, metal salts of the above fatty acids, silicone oil and at least a fatty acid ester composed of a monobasic fatty acid having from 2 to 20 carbon atoms and a monohydric alcohol having from 3 to 12 carbon atoms. The additive amount thereof is from 0.5 to 20 mg/m² on a magnetic layer.

A backing layer may be provided, if necessary, on the surface of the non-magnetic support opposite to the magnetic layer in the present invention.

A layer composed of an organic substance or an inorganic substance may be provided between the thin metal film of the magnetic layer and the non-magnetic support.

The present invention will be illustrated in more detail by the following Example, but should not be limited thereto. Unless otherwise specified, all parts, percents, ratios and the like are by weight.

EXAMPLE

A magnetic layer containing iron, nitrogen and oxygen was formed on a 13 $\mu$m-thick polyethylene terephthalate film by an inclined vapor-deposition method using the vapor-deposition apparatus shown in FIGURE resulting in a magnetic tape. Nitrogen gas was introduced through the ion gun and oxygen was also introduced through the oxygen introducing pipe 11. The angle of incidence of iron atoms was adjusted within the range of from 90° to 60° with a screening mask. The degree of vacuum during vapor-deposition was $2.6 \times 10^{-6}$ Torr. The vapor-deposited film thickness was 0.15 $\mu$m.

Samples with the various amounts of iron, nitrogen and oxygen shown in Table 1 were prepared by changing the amounts of oxygen gas introduced and the irradiation amounts of nitrogen ion introduced.

The output of each of these samples at 6 MHz was measured using a modified 8 m/m VTR, "FUJIX-8M6", manufactured by Fuji Photo Film Co., Ltd.

Corrosion resistance of these samples was evaluated by dipping the samples in a 5% aqueous solution of sodium chloride for one week. Whether or not rust was present was then visually rated according to the following rating system:

A: Rust was not observed.

B: A slight amounts of rust was observed.
C: Rust was clearly observed.

The results are shown in Table 1. When the output of each sample at 6 MHz was measured, a commercially available 8 mm metal tape was used as a standard against which the output of each sample was compared.

TABLE 1

| Sample | Ratio of atomic percentage a:b:c | Output at 6 MHz | Corrosion resistance after dipping in NaCl |
|---|---|---|---|
| 1 | 75:8:16 | +5 dB | A |
| 2 | 77:4:19 | +3 dB | A |
| 3 | 76:18:6 | +2 dB | A |
| 4 | 79:10:11 | +7 dB | A |
| 5* | 76:1:23 | −2 dB | B |
| 6* | 85:0:15 | Impossible to measure (no output) | C |
| 7* | 75:25:0 | −1 dB (There was output fluctuation.) | A |
| 8* | 64:8:28 | +3 dB | B |
| 9* | 76:22:2 | +1 dB (There was output fluctuation.) | A |
| 10* | 69:10:21 | 0 dB | B |
| Standard tape | Commercially available 8 mm product | 0 dB (ref.) | — |

*Comparative samples

The magnetic recording medium of the present invention was excellent magnetic characteristics in that the recorded signal output is improved and corrosion resistance is also improved. Output measured at 6 MHz was high in every case in which a metal tape of the present invention was used. The samples having a low nitrogen content had a low output and the output of the sample having no nitrogen content could not be measured. High nitrogen content was not always satisfactory. When the oxygen content was zero, output fluctuation was heavy. It is believed that the coexistence of nitrogen and oxygen increases the strength of the magnetic layer. Further the samples which have an oxygen and nitrogen content outside the predetermined range of the present invention had poor corrosion resistance. Therefore, it is necessary that the iron, nitrogen and oxygen content fall within the range as defined in the claims of the present invention.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon a thin ferromagnetic metal film, wherein the thin ferromagnetic metal film comprises iron, nitrogen and oxygen atoms within the following atomic percent ranges:

$$57 \leq a \leq 90$$

$$2 < b < 20$$

$$5 < c < 23$$

$$b + c < 25$$

in which a, b and c represent the percentage of iron nitrogen and oxygen atoms, respectively, based on the total of iron, nitrogen and oxygen atoms in the thin ferromagnetic metal film.

2. The magnetic recording medium as in claim 1, wherein the thin ferromagnetic metal film comprises iron, nitrogen and oxygen atoms within the following atomic percent ranges:

$$65 \leq a \leq 85$$

$$3 < b < 15$$

$$10 < c < 22$$

$$b + c < 25$$

in which a, b and c are defined as in claim 1.

3. The magnetic recording medium as in claim 2, wherein the thin ferromagnetic metal film contains about from 8 to 12 atomic % of a nitrogen atom and contains from 10 to 12 atomic % of an oxygen atom.

4. The magnetic recording medium as in claim 1, wherein the thin ferromagnetic metal film is provided on the non-magnetic support at a thickness of 0.02 to 5.0 μm.

5. The magnetic recording medium as in claim 1, wherein the thin ferromagnetic metal film is provided on the non-magnetic support at a thickness of 0.05 to 2.0 μm.

6. The magnetic recording medium as in claim 1, wherein the thin ferromagnetic metal film is formed by depositing vaporized iron atoms on the non-magnetic support with an incident angle which is continuously decreased.

7. The magnetic recording medium as in claim 1, wherein the thin ferromagnetic metal film consists essentially of iron atoms, nitrogen atoms and oxygen atoms.

* * * * *